United States Patent [19]

Kirschstein

[11] 4,198,165

[45] Apr. 15, 1980

[54] APPARATUS AND METHOD FOR MEASURING AN OBJECT

[75] Inventor: Werner P. Kirschstein, Greensboro, N.C.

[73] Assignee: Loew's Theatres, Inc., New York, N.Y.

[21] Appl. No.: 895,535

[22] Filed: Apr. 12, 1978

[51] Int. Cl.$^2$ .................. G01B 11/02; G01B 11/04; G01B 11/08

[52] U.S. Cl. .................................. 356/383; 250/224; 356/385; 356/386

[58] Field of Search ......................... 356/385–387, 356/383, 1, 380, 372; 250/224, 559–563, 571–572, 223 R, 223 B

[56] References Cited

U.S. PATENT DOCUMENTS

| | | | |
|---|---|---|---|
| 3,487,226 | 12/1969 | Yetter et al. | 250/222 R |
| 4,063,820 | 12/1977 | Borgese | 356/386 |

Primary Examiner—John K. Corbin
Assistant Examiner—Wm. H. Punter
Attorney, Agent, or Firm—Brumbaugh, Graves, Donohue & Raymond

[57] ABSTRACT

An apparatus for measuring an object comprises a rotatable fixture that holds the object to be measured with one end positioned at a fixed location spaced from the axis of rotation of the fixture and the other end projecting freely from the fixture. A scanner that generates a planar unidirectional scanning beam is positioned with respect to the fixture and object such that at one point of rotation of the object the free end of the object intersects the plane of the scanning beam, and along a subsequent portion of the arc of rotation, the entire object, in cross section, projects through the beam. A sensor located at the terminal end of beam travel and coupled to the scanner detects the interruption by the object of the scanning beam as the object rotates, and produces signals indicative of (a) the distance between the point where the object first intersects the scanning beam and a reference line in the plane of the beam, which signal is a function of the length of the object and (b) the width of the beam blocked by the object when it projects through the beam, which signal is a function of the dimension of the object along an axis lying in the beam and perpendicular to the beam direction. Several widthwise measurements can be made as the object rotates through the beam.

7 Claims, 3 Drawing Figures

APPARATUS AND METHOD FOR MEASURING AN OBJECT

BACKGROUND OF THE INVENTION

This invention relates to an apparatus and method for measuring the length and width, or several widths, of an object using a conventional laser scanner measuring device.

Laser scanner measuring devices are presently available commercially. These devices generate a planar unidirectional scanning beam and by means of a sensor coupled to the beam scanner are capable of making any of several measurements of an object which is projecting through the beam at a right angle by sensing the segment which is blocked or exposed by the object projecting through the plane of the beam. As far as known to the present inventor, laser scanner measuring devices have been used only for measuring dimensions of objects in the plane of the beam, i.e., dimensions in the beam plane and perpendicular to the direction of the beam, by direct placement of the part of the object to be measured in the beam path.

SUMMARY OF THE INVENTION

This invention provides, inter alia, a method and apparatus for using a laser scanner measuring device for determining a dimension of an object along an axis that does not lie in the beam plane. In addition, the invention permits convenient and rapid measurements of the object at various orientations within the plane of the beam.

More particularly, apparatus according to the present invention comprises a rotatable fixture which holds the object such that one end is positioned at a fixed location spaced from the axis of rotation of the fixture and the other end projects freely from the fixture. A scanner that generates a planar unidirectional scanning beam is positioned with respect to the fixture and object such that the axis of rotation of the fixture is oblique to the plane of the beam and lies in a plane perpendicular to the beam and such that at one point of rotation of the object the free end intersects the plane of the scanning beam. Preferably along a subsequent portion of the arc of rotation, the entire object, in cross section, projects through the plane of the scanning beam when viewed in the direction of the travel of the beam. A sensor located at the terminal end of beam travel and coupled to the scanner detects the interference of the object with the scanning beam as the object rotates, and determines the distance between the point where the object first intersects the scanning beam and a reference line in the plane of the beam, which measurement is a function of the length of the object. Additionally, the sensor determines the width of the scanned region that is blocked by the object at one or more positions along the arc of rotation of the object when the entire object, in cross section, projects through the plane of the beam, which measurements are a function of the object width taken at specified orientations. Where the object is cylindrical, a series of measurements can be compared to determine the roundness of the object.

The invention is particularly useful for making repeated measurements of similar objects, such as in a quality control operation. For that purpose, the fixture is preferably constructed to permit the objects to be quickly and easily—automatically where possible—secured to it and rapidly rotated through the beam either continuously or in steps. The output of the measuring device is readily adaptable to data processing by either dedicated or general purpose computers suitably programmed to, for example, make necessary or desired calculations, to signal out-of-standard items and record and store results. On the other hand, visual observation or manual recording, if desired, of output values appearing on the display of the laser beam measuring device is entirely adequate for effective use of the invention.

DESCRIPTION OF THE DRAWINGS

For a further understanding of the invention, reference may be made to the following description of an exemplary embodiment, taken in conjunction with the accompanying drawings, in which.

DETAILED DESCRIPTION OF THE PREFERRED EMBODIMENTS

Figure 1:
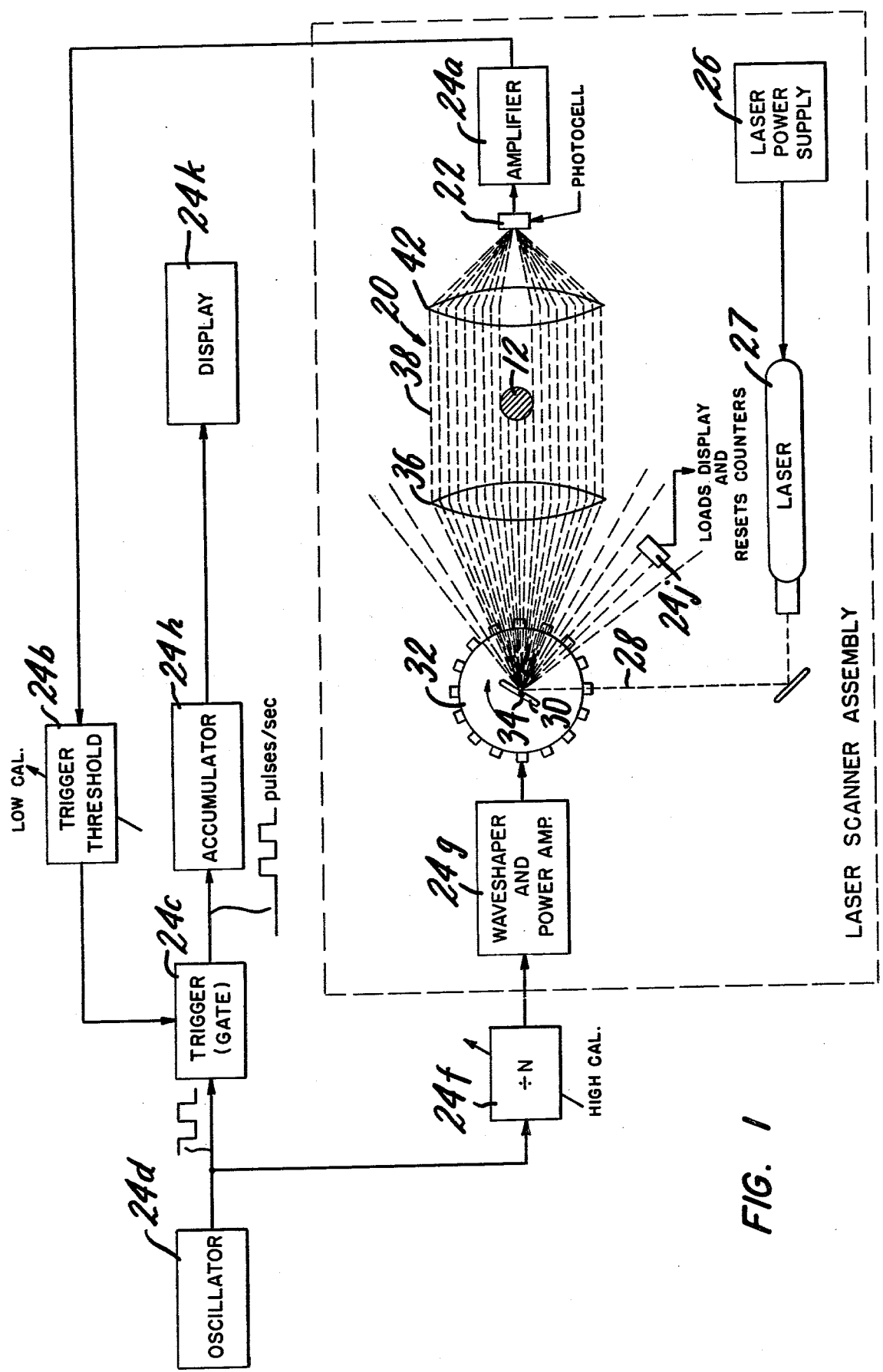
FIG. 1 is a schematic diagram of the laser scanner measuring device used in the practice of the invention.

Laser scanner measuring devices suitable for use in the present invention are commercially available. One such device is the Autometrix of Model M1150F "Lasermike" shown schematically in FIG. 1. Briefly, a power supply 26 and laser source 27 generate a laser beam 28 which is directed onto a mirror 30 that is rotated about an axis 34 by a hysteresis synchronous motor 32. The mirror 30 is positioned at the focal point of a first double convex converging lens 36 and directs the beam through the lens 36. The rotational movement of the mirror 30 causes the beam 28 to sweep a region 20 lying in a plane perpendicular to the axis 34 of rotation of the mirror. Since the mirror 30 is at the focal point of the lens 36, the direction of travel of the beam 28 within the scanned region 20 is unidirectional. At the terminal end of the scanned region 20, a second double convex converging lens 42 intercepts the beam 28 and directs it onto a photocell or other light sensor 22 positioned at its focal point. Thus, the beam 28 will strike the sensor 22 at the terminal end of the scanned region 20 at all times when part of the scanned region is not blocked by an object being measured.

The detecting circuitry 24 monitors the position of the mirror 30 in relation to the sensing of the laser beam 28 by the sensor. In so doing, it determines that an object either blocks or does not block the beam 28 along a certain path of travel within the scanned region 20. The sensor 22 generates an output signal responsive to the detection of the laser beam 28. When the beam is blocked by the object, the output signal will be smaller—a small signal results from background light striking the sensor. The sensor output is fed into an amplifier 24a, and thereafter into a threshold detector 24b, the output of which will be either the signal value (if high enough, i.e., when the beam is sensed by the sensor 22) or zero. This signal is then fed into an "and gate" 24c, which also receives the output signal of an oscillator 24d. The oscillator 24d generates a characteristic wave shape, for example, a square wave form, of a given frequency, which is fed into the "and gate" 24c and is modified in response to the output signal from the threshold detector 28b. For example, where a square wave is generated by the oscillator, as each pulse is received in the "and gate" it will either be emitted unchanged if an output of the threshold detector 24b is detected, or emitted as zero if the output of the threshold detector 24b is zero. Thus, the sensor 22 output signal is converted from an analog form to a desired number of pulses per second, each pulse being either positive if at that instant the sensor 22 detects the beam 28, or zero if it does not. These pulses also correspond to a specified path of travel of the beam 28 within the scanned region 20, since the oscillator 24d, synchronously with generating signal pulses, regulates the rotation of the mirror 30, and thus the sweep of the laser beam 28.

The oscillator signal is first fed into a countdown 24f for dividing by N (frequency of the oscillator), and thereafter into a waveshaper and power amplifier 24g, which regulates the motor 32 and thus the sweep of the laser beam 28. Therefore, since each "and gate" pulse corresponds to a given path of travel of the beam 28, they may be fed into an accumulator 24h which for each sweep of the laser beam 28 will determine the distance "a" (see FIG. 3) from the upper boundary 38 of the scanned region 20 to the point where the beam is first intersected by the object 12, the width "b" of the scanned region 20 blocked by the object 12 projecting through the plane of the scanned region 20, and the distance (not labelled) from the lower boundary 40 of the scan path to the lowest point of the object 12 projecting through the plane of the scanned region 20. After each sweep of the laser beam 28, it strikes a photocell 24j which loads the display 24k, and resets the circuitry for the next sweep. This laser scanner measuring device is also capable of measuring the respective widths of blocked and unblocked segments of the scanned region 20 where an object or objects project through the region 20 at more than one location simultaneously.

The present invention employs a suitable scanning-type measuring device such as the one described above in a new way to measure the length along a selected axis of an object or part of an object. The invention is especially useful for making measurements of dimensions greater than the width of the scan of the measuring device and permits one or several measurements to be made rapidly in a single setup and run.

The invention involves placing the object to be measured in a rotatable fixture which is positioned with its axis of rotation oblique to the beam and lying in a plane perpendicular to the beam. The fixture is constructed to hold the objects with a selected part, such as the end, of the object at a known location relative to the beam and with the other end of the object projecting from the fixture. The setup is such that upon rotation of the fixture, the free end of the object will intersect the beam at some point along its orbital path.

By way of example, the drawings show equipment for measuring the lengths and diameters of rods "R", such as lengths of plastic tubing that will be cut into mouthpieces for cigarettes, in a quality control procedure. Proper operation of cigarette tipping machines and uniformly high quality of the tipped cigarettes is ensured by maintaining the length diameter and roundness of the rods R within certain standards.

The rods R to be measured are loaded into a hopper 40 having a slot in the bottom for depositing the rods one at a time in a fixture 42. The fixture is a drum having a lengthwise groove 44 in its surface accepting the rods one by one from the hopper, the groove having an end wall 46 which positions one end of each rod at a known location. A leaf spring 45 on the end of the hopper gently pushes each rod toward the back wall of the hopper to ensure that the rod will be properly positioned with its end against the end wall 46 of the groove. The fixture is cantilevered on a shaft 55 that is journaled for rotation on a rigid support frame 48 and is driven in rotation by a drive 50. The rods are held in the grooves by vacuum communicated from a source 52 through passages 54 in the drum which open into the bottom of the groove and are ejected into a trough or receptacle (not shown) by bleeding atmospheric pressure to the passages (54) and mechanically lifting the rod (R) out of the groove (44). The timing of the vacuum supply and atmospheric pressure to the drum is controlled by a rotary valve 58, which has a pair of passages, 60 and 61, for selectively connecting the vacuum source 52, or the atmosphere, with passage 54.

Figure 2:
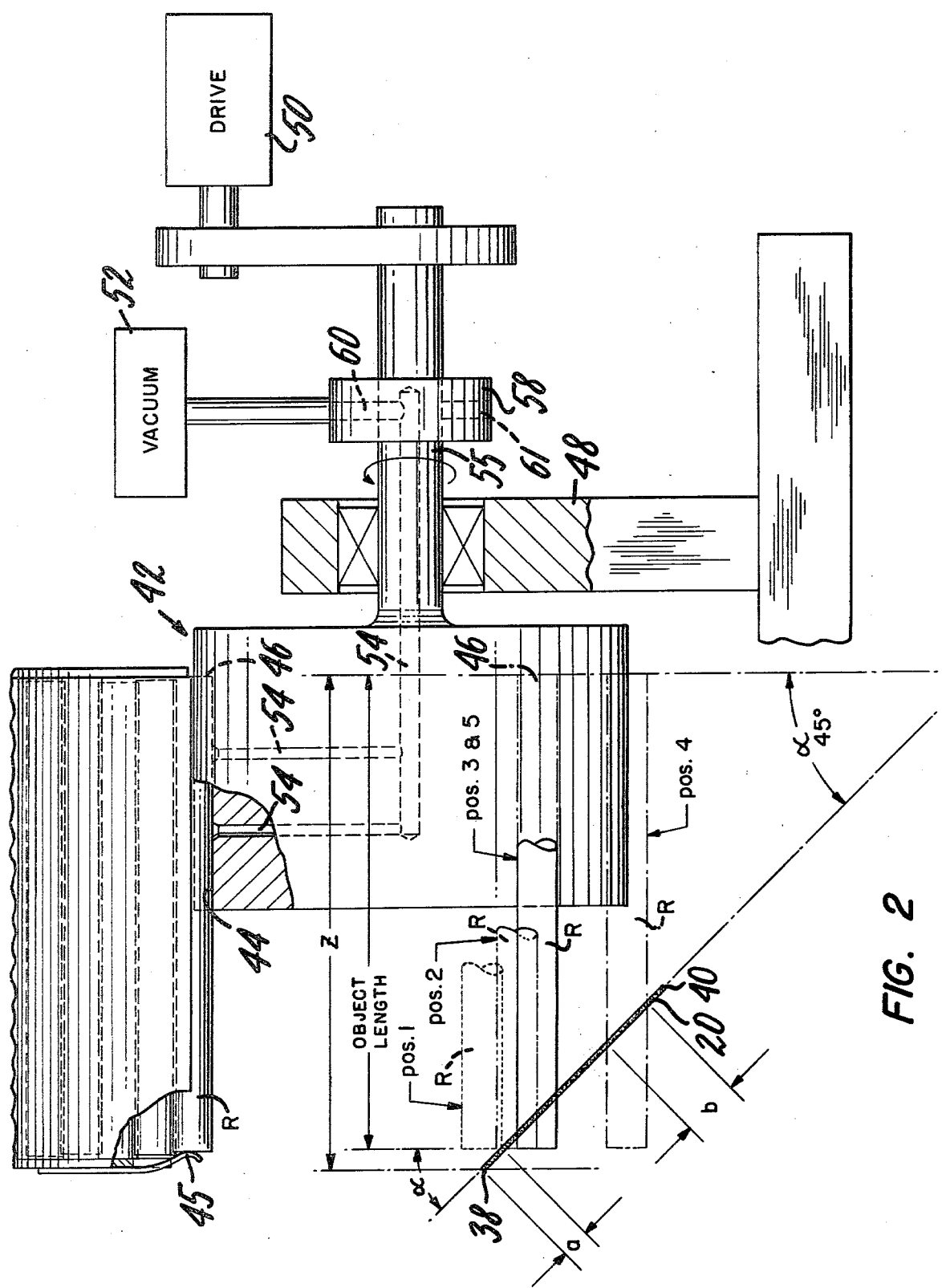
FIG. 2 is a side view in generally schematic form of the embodiment.
Figure 3:
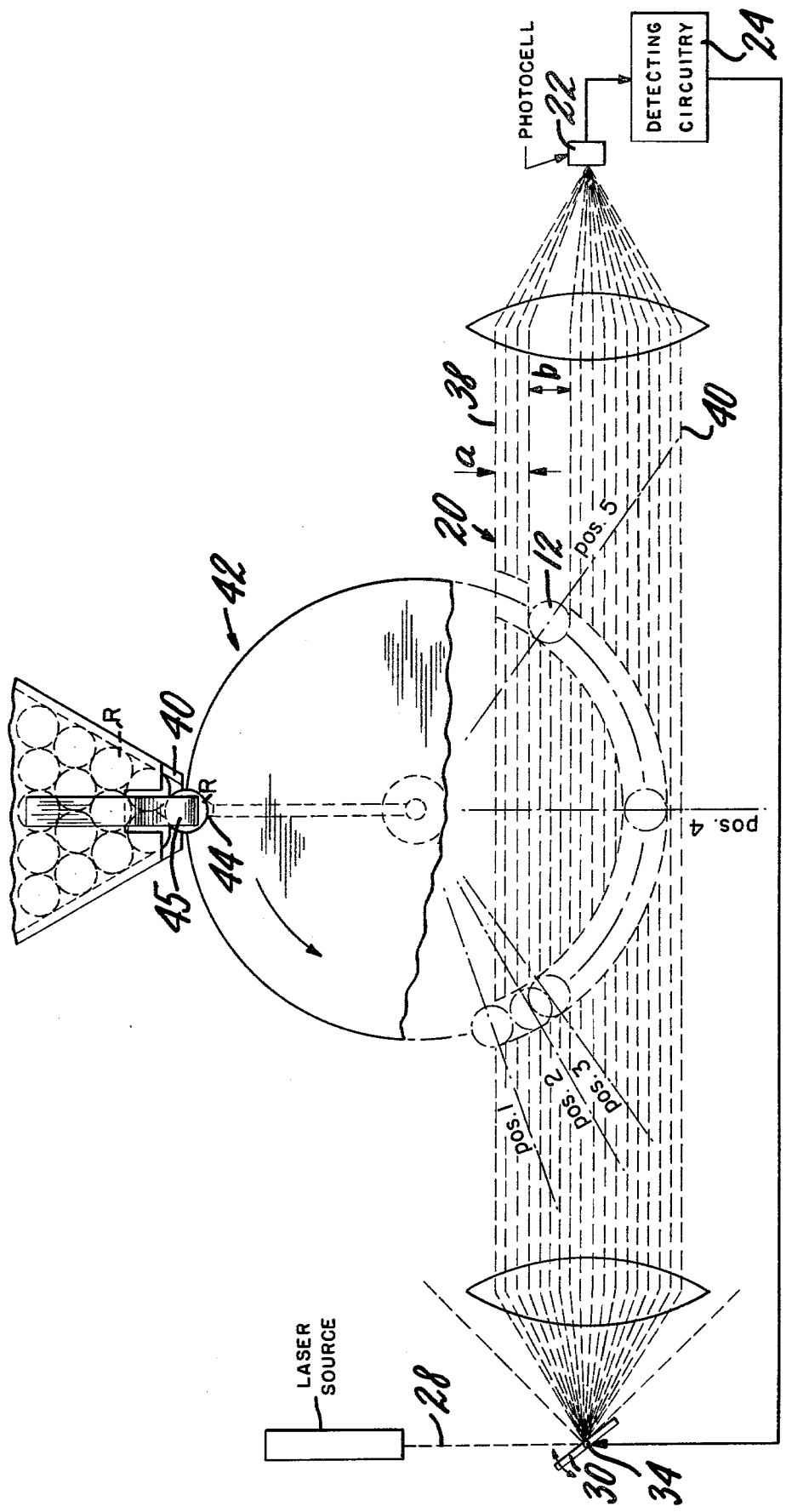
FIG. 3 is an end view, also in generally schematic form, of the embodiment.

The length of the rod R being measured is a function of, inter alia, the distance "a" determined by the measuring device at the point when the end of the rod intersects the beam, and, moreover, that distance "a" will be monitored and displayed as long as the rod only partly intersects the beam, i.e., from position 1 to position 2 in FIGS. 2 and 3. This provides a time frame for the value "a" to be observed on the display or for the signal indicator of the value "a" to be fed to a computer.

The length of the rod being measured is determined by the formula $Z - a \sin \alpha$, in which Z is the perpendicular distance between the plane through which the end wall of the groove of the fixture rotates, and the top reference line of the laser beam, a distance which is predetermined in setting up the equipment; a is the measured distance in the beam, as previously described; and $\alpha$ is the angle between the plane of the laser beam and the plane through which the end wall of the groove of the fixture rotates, an angle which is also predetermined by the setup.

For a "manual" quality control operation, the specification for length can be in terms of the value "a", and the measured values of "a" can be monitored visually on the display, out-of-standard rods can be intercepted and traced and their sources for further checking and possible rejection, or records maintained to permit statistical analyses of rod quality. The speed of the measuring procedure, i.e., the rate of rotation of the fixture, can be established to suit the ability of the operator to detect and intercept or record faulty rods. With a computerized operation, very high speeds are possible, and speeds of 10 to 20 rods per minute are feasible for a "manual" operation.

At all positions of the rod in which it projects entirely through the beam, i.e., anywhere from about position 3 to about position 5, rod diameter can be determined from the formula $b \cos \alpha$, in which b is the measured value of the section of the beam blocked by the rod; and $\alpha$ is the angle previously identified and described. Several measurements of diameter at various points along the orbit of the rod permit roundness to be determined; note that as the rod orbits the axis of the fixture, the diametrical plane of the rod blocking the beam at each instant is different. It is useful, therefore, to determine an average diameter and a value indicative of roundness and to compare measured values with standards.

Thus, there is provided, in accordance with the invention, an efficient, low-cost way of making various measurements of objects in a single setup of relatively simple equipment. The invention is useful for irregularly shaped objects and is not limited to rods or tubes.

There are, of course, size limits on the width (in-the-beam) measurements that can be made. The limit on length measurement is not, however, a function of the beam width and can be quite large. The length measurement and multiple width measurements can be used separately. Various fixtures are readily designed to hold the objects being measured. Computerization enhances the usefulness of the equipment and is within the ordinary skill of the computer art.

I claim:

1. An apparatus for measuring an object comprising:
   (a) a fixture rotatable about an axis and having means for holding the object such that one end of the object is located at a specified location spaced from the axis of rotation and the other end projects freely from the fixture;
   (b) scanning means for producing a unidirectional scanning beam sweeping a region forming a plane, said scanning means being positioned such that the plane of the beam is oblique to the axis of rotation of the fixture and the end of the object intersects the beam at least at one point along its arc of rotation;
   (c) sensing means at the terminal end of the scanned region for detecting the beam after it has passed through the scanned region; and
   (d) means coupled to said sensing means for determining the distance between the point of intersection of the free end of the object with the beam and a reference line in the plane of the beam when the free end intersects the scan path.

2. Apparatus according to claim 1, wherein:
   (a) the fixture and scanning means are positioned relative to each other such that along a portion of its arc of rotation the entire object, in cross-section, projects through the plane of the scanned region when viewed in the direction of travel of the beam; and
   (b) said determining means includes means for determining the width of the scanned region blocked by the object when the entire object, in cross-section, projects through the plane of the scanned region.

3. An apparatus for measuring an object according to claim 1, wherein the scanning means is positioned relative to the fixture such that the axis of rotation of the fixture lies in a plane perpendicular to the plane of the beam.

4. A method of measuring an object comprising the steps of generating a planar unidirectional scanning beam, rotating the object about a fixed axis that is oblique to the plane of the beam while holding the object in fixed position relative to the axis, the path of rotation of the object about the axis being such that an end of the object intersects the beam at some point, and detecting the distance in the plane of and perpendicular to the direction of the beam between the point of intersection of the object with the beam and a reference line in the beam and parallel to the direction of the beam.

5. A method according to claim 4, wherein the path of rotation of the object is such that a part of the object projects entirely through the beam during a portion of the rotation and the width of the scanned region blocked by the object is detected at at least one point during such portion of the rotation.

6. A method according to claim 5, wherein the width of the blocked region is determined at several different points during such portion of the rotation.

7. A method according to claim 4, wherein the axis of rotation of the fixture lies in a plane perpendicular to the plane of the beam.

* * * * *